UNITED STATES PATENT OFFICE.

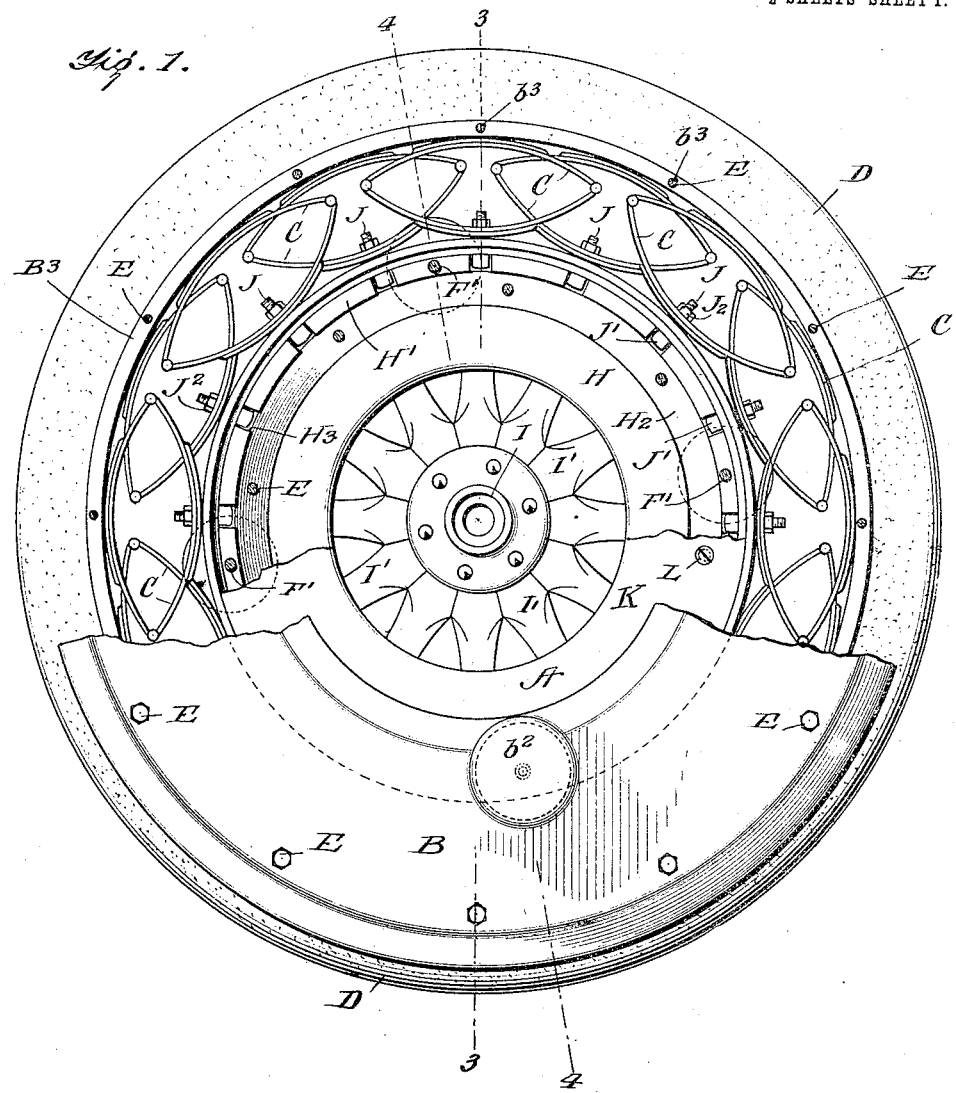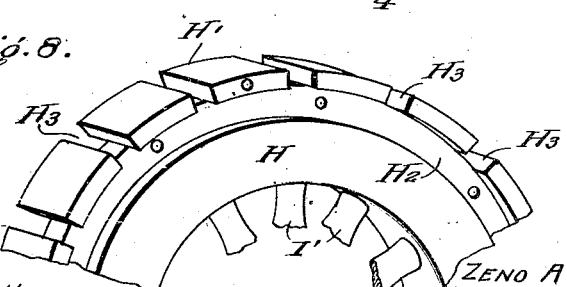

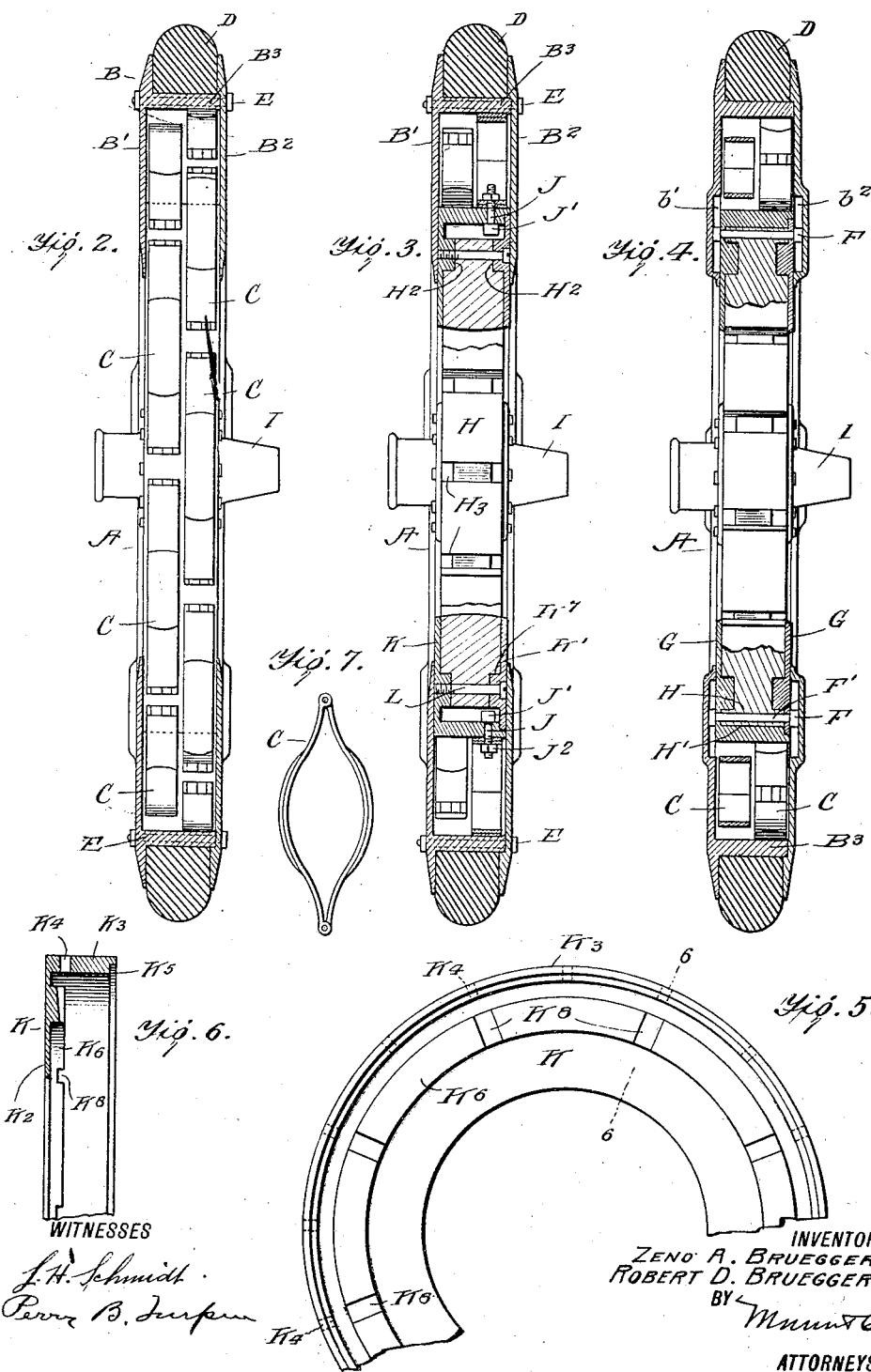

ZENO A. BRUEGGER AND ROBERT D. BRUEGGER, OF CULBERTSON, MONTANA.

SPRING-WHEEL.

977,368. Specification of Letters Patent. Patented Nov. 29, 1910.

Application filed September 15, 1909, Serial No. 517,846. Renewed October 31, 1910. Serial No. 589,951.

*To all whom it may concern:*

Be it known that we, ZENO A. BRUEGGER and ROBERT D. BRUEGGER, citizens of the United States, and residents of Culbertson, in the county of Valley and State of Montana, have made certain new and useful Improvements in Spring-Wheels, of which the following is a specification.

This invention is an improvement in spring wheels; and consists in certain novel constructions and combinations of parts as will be hereinafter described and claimed.

In the drawings Figure 1 is a side view of a wheel embodying our invention, parts being broken away, showing the wheel in section. Fig. 2 is an edge view of the wheel, the rim section being shown in section, and the other parts being shown in elevation. Fig. 3 is a cross section on about line 3—3 of Fig. 1, and Fig. 4 is a cross section on about line 4—4 of Fig. 1. Fig. 5 is an elevation of the inner face of one of the casing sections of the body of the wheel. Fig. 6 is a detail sectional view on about line 6—6 of Fig. 5, and Fig. 7 is a detail side view of a somewhat different form of spring from that shown in Fig. 1, and Fig. 8 is a detail perspective view of the central portion of the wheel body.

In carrying out the invention we provide a central or body section A, and a rim section B, and springs C, between the same for cushioning the action of the wheel. The rim B has side sections $B'$ and $B^2$, the section $B'$ having a circumferential ring $B^3$ receiving the rubber or other tire D, the sections $B'$ and $B^2$ being held together by the bolts E, and the ring $B^3$ being perforated transversely at $b^3$ to receive the said bolts.

The side plates $B'$ and $B^2$ extend inwardly and overlap at their inner edges the outer edge of the body of the wheel and are cupped or recessed in their inner faces at $b'$ and $b^2$ to receive the rollers F carried by the body of the wheel whereby to limit the radial and circumferential movement of the wheel body independently of the rim. These rollers F are supported at the ends of bolts $F'$ extending through the body of the wheel near the outer edge thereof and projecting through the casing plates G of the body of the wheel, and also through the notched rim portion $H'$ of the felly H of the wheel body.

In forming the body of the wheel we provide a hub I, and a felly H supported from the hub by means of spokes $I'$ or in any other suitable manner, and the felly H is grooved in its opposite faces at $H^2$ throughout the circumference of the felly, and the rim portion $H'$ of the felly is provided with transverse notches $H^3$ extending the full width of the rim portion and of a depth equal to the said rim portion so that the notches $H^3$ communicate with the circumferential grooves $H^2$ in the opposite faces of the rim, permitting the application of the spring holding bolts J, as shown in Fig. 3, and will be understood from Fig. 8 of the drawings.

It will be noticed that the bolts may be applied from either side of the felly H, so they can conveniently be placed to position to secure the springs which as presently described, are arranged in two rows side by side as best shown in Figs. 2, 3 and 4 of the drawings.

The casing plates K and $K'$ of the body of the wheel incase the rim portion and are secured together by cross bolts L. The casing plate K has a side plate $K^2$, and a rim plate $K^3$ projecting laterally from the outer edge of the side plate $K^2$ and provided with openings $K^4$ for the spring holding bolts, and at its free edge the rim plate $K^3$ is rabbeted at $K^5$ for the reception of the casing plate $K'$, the parts K and $K'$ being secured together by bolts L which also operate to unite them firmly with the felly of the body of the wheel.

As shown, the casing plate K is provided on its inner face with an annular bead $K^6$, and the plate $K'$ has a similar annular bead $K^7$ on its inner face, such beads fitting in the circumferential grooves $H^2$ formed in the opposite sides of the felly H. These beads operate to strengthen and reinforce the casing plates and also aid in connecting the casing plates firmly with the felly, as well as affording a thickened portion for engagement by the connecting bolts L, as shown in Figs. 3 and 4 of the drawings.

The beads $K^6$ and $K^7$ are notched at $K^8$ for the passage of the spring securing bolts J to the position shown in Figs. 1 and 3, in which the heads $J'$ of said bolts fitting within the notches $H^3$ of the rim portion $H'$ of the felly will be held thereby from turning. The grooves or notches $K^8$ permit the passage of the bolt heads $J'$ in adjusting the parts to the position shown in Figs. 1 and 3.

It will be noticed that the casing plates

K and K' form metallic bearings for the inner edges of the plates B' and B² of the outer section of the wheel and enable us to secure a tight fit of the parts when they are applied for use as shown in Figs. 3 and 4 of the drawings.

The springs may be ordinary elliptical springs as shown in Fig. 1, or they may be of the peculiar shape shown in Fig. 7, and they bear between the body of the wheel and the outer or rim section and they are held to the body of the wheel by the bolts J, which pass through the inner bars of the springs and receive the nuts J² by which the springs are retained on the bolts. As best shown in Figs. 1 to 4, the springs are arranged in two circumferential rows side by side with the springs of the two rows alternating or staggered so that the ends of the springs of one row lie opposite the middle portions of the springs of the other row. This construction is useful as it enables us to use springs of the maximum size and also to provide for the maximum number of springs in a wheel of a given size, also for arranging the springs comparatively close around the circumference of the wheel as will be understood from Fig. 1 of the drawings.

We claim:—

1. A wheel substantially as herein described comprising a central or body section and a rim section the latter having side sections, and a circumferential ring, and the body section being provided with a hub, a felly supported from the hub and having in its opposite faces circumferential grooves, and having a rim portion beyond said grooves notched transversely in its outer face with its notches communicating at their ends with the circumferential grooves in the felly, casing plates fitted to the opposite sides of the felly and provided on their inner faces with circumferential beads entering the grooves of the felly and having notches coinciding with the transverse notches in the rim portion of the felly, bolts securing the side plates of the body together and to the felly, spring securing bolts having heads adapted to pass through the notches in the beads of the casing plates and to be locked from turning in the transverse grooves of the rim portion of the felly, springs arranged between the body and rim sections in two circumferential series side by side and alternating with each other and held by the spring securing bolts, and means for limiting the movement of the central or body section relative to the rim section, substantially as and for the purpose set forth.

2. A wheel comprising a central or body section having a felly provided in its opposite faces with circumferential grooves and beyond the same with a rim portion having transverse notches communicating at their ends with the circumferential grooves, casing plates fitting against the opposite sides of the felly and having on their inner faces circumferential beads entering the grooves of the felly and one of said casing plates having a rim plate extending over the notched rim of the felly and provided with bolt holes communicating with the notches of said rim, springs on the outer side of said body section, bolts securing said springs and having heads held from turning in the notches of the rim portion of the felly, a rim section having side plates and a rim plate incasing said springs with the side plates slidable at their inner edges along the casing plates of the central or body section of the wheel, and means for limiting the movement of the central or body section relative to the rim section, substantially as set forth.

3. The combination in a spring wheel with a rim section, and a central or body section having a felly, and casing plates fitted thereto and having a rim plate overlying the felly, the felly being notched in its outer face, elliptical springs bearing between the body section and the rim section, bolts securing said springs and passed through the rim plate of the casing of the body section and having their heads held in the notches of the felly, and means for limiting the movement of the central or body section relative to the rim section, substantially as set forth.

4. A wheel comprising a rim section, and a body section fitted therein and having a felly provided in its opposite sides with circumferential grooves, and a casing fitting over the felly and having a rim plate and side plates, the latter being provided with circumferential beads entering the grooves of the felly and provided with notches for the passage of bolt heads, bolts having heads adapted to pass through said notches, the bolts being passed through the rim plate of the casing, and springs held by said bolts and bearing between the body section and the rim section and means for limiting the movement of the central or body section relative to the rim section, substantially as set forth.

ZENO A. BRUEGGER.
ROBERT D. BRUEGGER.

Witnesses:
LELAND C. CAULEY,
GERVAS H. COULTER.